(12) United States Patent
Garassino et al.

(10) Patent No.: US 10,352,190 B2
(45) Date of Patent: Jul. 16, 2019

(54) COOLING OF AN OIL CIRCUIT OF A TURBOMACHINE

(71) Applicant: SAFRAN AIRCRAFT ENGINES, Paris (FR)

(72) Inventors: Alain Pierre Garassino, Crisenoy (FR); Olivier Robert Michel Delepierre-Massue, Ozoir la Ferriere (FR); Marc Missout, Montigny le Bretonneux (FR); Mathieu Jean Pierre Trohel, Saint Vrain (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 460 days.

(21) Appl. No.: 14/415,313

(22) PCT Filed: Jul. 12, 2013

(86) PCT No.: PCT/FR2013/051680
§ 371 (c)(1),
(2) Date: Jan. 16, 2015

(87) PCT Pub. No.: WO2014/013170
PCT Pub. Date: Jan. 23, 2014

(65) Prior Publication Data
US 2015/0192033 A1    Jul. 9, 2015

(30) Foreign Application Priority Data
Jul. 19, 2012  (FR) ...................................... 12 57015

(51) Int. Cl.
*F02B 25/12*    (2006.01)
*F02B 25/18*    (2006.01)
(Continued)

(52) U.S. Cl.
CPC ............. *F01D 25/12* (2013.01); *F01D 25/18* (2013.01); *F01M 5/00* (2013.01); *F02C 7/14* (2013.01);
(Continued)

(58) Field of Classification Search
CPC .......... F01D 25/12; F01D 25/18; F01D 25/20; F01D 25/125; F01M 5/00; F01M 5/002;
(Continued)

(56) References Cited

U.S. PATENT DOCUMENTS 2,979,293 A * 4/1961 Mount ................. B64D 13/006
165/43
3,705,496 A * 12/1972 Wolf ......................... F02K 3/02
60/267
(Continued)

FOREIGN PATENT DOCUMENTS

| EP | 1 895 124 | 3/2008 |
|----|-----------|--------|
| FR | 2 914 365 | 10/2008 |

(Continued)

OTHER PUBLICATIONS

International Search Report dated Nov. 15, 2013 in PCT/FR13/051680 filed Jul. 12, 2013.

*Primary Examiner* — Jason D Shanske
*Assistant Examiner* — Jessica L Kebea
(74) *Attorney, Agent, or Firm* — Oblon, McClelland, Maier & Neustadt, L.L.P.

(57) ABSTRACT

A turbomachine or a turbojet engine or a turboprop engine of an aircraft, including at least one oil circuit and a cooling mechanism including a refrigerant circuit including a first heat exchanger configured to exchange heat between the refrigerant and air and forming a condenser, a second heat exchanger configured to exchange heat between the refrigerant and the oil of the oil circuit and forming an evaporator, (Continued)

an expander mounted downstream from the first exchanger and upstream from the second exchanger, in a direction in which the refrigerant circulates, and a compressor mounted downstream from the second exchanger and upstream from the first exchanger.

13 Claims, 3 Drawing Sheets

(51) Int. Cl.
    *F02M 5/00*     (2006.01)
    *F02C 7/14*     (2006.01)
    *F16N 39/02*     (2006.01)
    *F25B 1/00*     (2006.01)
    *F01D 25/12*     (2006.01)
    *F01D 25/18*     (2006.01)
    *F01M 5/00*     (2006.01)

(52) U.S. Cl.
    CPC .............. *F16N 39/02* (2013.01); *F01M 5/002* (2013.01); *F05D 2260/20* (2013.01); *F05D 2260/213* (2013.01); *F25B 1/00* (2013.01); *Y02T 50/675* (2013.01)

(58) Field of Classification Search
    CPC .......... F01M 5/005; F01M 5/007; F02C 7/12; F02C 7/14; F02C 7/16; F02C 7/18; F05D 2260/98; F05D 2260/205; F05D 2260/213; Y02T 50/675
    USPC ........................ 60/39.08, 266, 267; 184/6.11
    See application file for complete search history.

(56) References Cited

U.S. PATENT DOCUMENTS

| | | | | |
|---|---|---|---|---|
| 4,151,710 A * | 5/1979 | Griffin | | F02C 7/14 184/6.11 |
| 4,254,618 A * | 3/1981 | Elovic | | F02C 7/185 60/226.1 |
| 4,273,304 A * | 6/1981 | Frosch | | B64C 1/40 165/104.14 |
| 4,474,001 A * | 10/1984 | Griffin | | F02C 7/16 60/204 |
| 4,505,124 A * | 3/1985 | Mayer | | B64D 37/34 123/553 |
| 4,773,212 A * | 9/1988 | Griffin | | F02C 7/224 60/226.1 |
| 5,121,599 A * | 6/1992 | Snyder | | F01D 25/20 184/6.11 |
| 6,182,435 B1 * | 2/2001 | Niggemann | | B64D 41/00 60/266 |
| 6,948,331 B1 * | 9/2005 | Ho | | B64D 13/06 62/401 |
| 7,377,100 B2 * | 5/2008 | Bruno | | F01D 25/12 60/266 |
| 7,861,512 B2 * | 1/2011 | Olver | | F02C 7/14 60/226.1 |
| 8,522,572 B2 * | 9/2013 | Coffinberry | | B64D 13/06 165/235 |
| 8,789,376 B2 * | 7/2014 | Coffinberry | | F01D 25/08 60/226.1 |
| 8,967,531 B2 * | 3/2015 | Gagne | | B64D 13/006 244/58 |
| 9,254,920 B2 * | 2/2016 | Zhou | | F02C 6/08 |
| 2006/0005547 A1 * | 1/2006 | Brouillet | | F02C 7/12 60/802 |
| 2007/0256421 A1 * | 11/2007 | Dooley | | F01D 19/00 60/772 |
| 2008/0053099 A1 | 3/2008 | Venkataramani et al. | | |
| 2009/0313999 A1 | 12/2009 | Hunter et al. | | |
| 2010/0107603 A1 | 5/2010 | Smith | | |
| 2010/0212857 A1 | 8/2010 | Bulin et al. | | |
| 2011/0252764 A1 | 10/2011 | Smith | | |
| 2014/0140829 A1 * | 5/2014 | Blair | | F01D 25/10 415/177 |
| 2018/0050810 A1 * | 2/2018 | Niergarth | | B64C 21/06 |
| 2018/0050811 A1 * | 2/2018 | Niergarth | | B64D 27/18 |

FOREIGN PATENT DOCUMENTS

| | | | | |
|---|---|---|---|---|
| WO | 2009/140100 | 11/2009 | | |
| WO | 2010/051011 | 5/2010 | | |
| WO | WO 2016156756 A1 * | 10/2016 | ............ | F04C 28/125 |

\* cited by examiner

COOLING OF AN OIL CIRCUIT OF A TURBOMACHINE

This invention relates to a turbomachine, such as a turbojet engine or a turboprop engine of an aircraft, comprising at least one oil circuit and means for cooling the oil of this circuit.

In a known manner, a turbomachine comprises an oil circuit for the lubrication of equipment, such as in particular roller bearings or members of gears, and also comprises a fuel circuit supplying injectors mounted in a combustion chamber.

It is known to connect the oil and fuel circuits via heat exchangers with the purpose of avoiding a substantial heating of the lubrication oil, with the oil being cooled by exchange of heat with the fuel.

For this purpose, an oil/fuel heat exchanger is used arranged in the oil and fuel circuits downstream or upstream of one or several oil/air heat exchanger(s) mounted in the oil circuit. The oil/air heat exchanger is swept by an air flow coming from the exterior or interior of the turbomachine.

The oil/air heat exchanger is required to cool the oil when, for certain points of operation of the turbomachine, the oil/fuel heat exchanger does not make it possible to cool the oil sufficiently.

Other solutions are also known from prior art, as in particular the use of a thermostatic valve in a bypass line at the inlet of the oil/air heat exchanger or the use of sealing dampers for the supply with air.

Applications FR2951228, FR1061138 and FR1157953 of the Applicant describe architectures of oil and fuel circuits in a turbomachine.

The oil/air heat exchanger is for example of the surface type, i.e. it comprises oil ducts swept by a flow of cold air coming from a bypass air flow called secondary air flow. Such an exchanger is for example housed on a wall of the channel of the secondary flow, immediately downstream of the fan.

The oil/air heat exchanger can also be of the plate type and crossed by an air flow taken in the secondary air flow and reinjected at the outlet into the latter.

Current exchangers have relatively low outputs, which requires the use of exchangers that are relatively bulky. However, as the latter are placed in the secondary air flow, they generate aerodynamic disturbances which increase with their dimensions, which penalises the overall output of the turbomachine.

Furthermore, in the case of an oil/air exchanger for example, the difference in the temperature that can be used by the exchanger is reduced. By way of example, in certain operating phases of a turbojet engine, the temperature of the air is approximately 100° C. for example and the temperature of the oil not to be exceeded is for example approximately 150° C. The exchanger must therefore operate with a temperature difference of hardly 50° C., which limits the performance of the heat exchanger.

The invention in particular has for purpose to provide a simple, effective and economical solution to this problem.

To this effect, it proposes a turbomachine, such as a turbojet engine or a turboprop engine of an aircraft, comprising at least one oil circuit and means for cooling the oil of this circuit, characterised in that the means for cooling comprise a thermodynamic refrigerant circuit provided with
a first heat exchanger able to exchange heat between the refrigerant and the air and forming a condenser,
a second heat exchanger able to exchange heat between the refrigerant and the oil of the oil circuit and forming an evaporator,
an expander mounted downstream of the first exchanger and upstream of the second exchanger, in the direction in which the refrigerant circulates, and
a compressor mounted downstream of the second exchanger and upstream of the first exchanger.

In this way, the oil circuit is no longer cooled using a simple heat exchanger of the air/oil type but using a thermodynamic device of the heat pump type.

In this device, the heat is taken on the oil by the evaporator, then transferred to the air by the condenser, by the intermediary of the refrigerant. Using the preceding example (temperature of the air of approximately 100° C.), it is possible to bring the refrigerant to temperatures substantially higher than 150° C., in such a way as to be able to operate with a difference in temperature much greater than 50° C., which increases the effectiveness of the condenser and makes it possible in particular to limit the size of this condenser in such a way as to not affect the overall performance of the turbomachine.

Surprisingly, the gain provided by the invention in terms of performance offsets the adding of the new elements comprising the heat pump and the disadvantages which are usually linked to such an addition (encumbrance, weight, etc.).

Preferably, the turbomachine comprises a secondary stream for the passing of a secondary flow coming from a fan, with the first exchanger being arranged in the secondary stream.

Alternatively, the first exchanger is designed to exchange heat between the refrigerant and the ambient air, external to the turbomachine.

According to a characteristic of the invention, the oil circuit is designed to lubricate and/or cool elements of the motor of the turbomachine and/or a piece of equipment, such as an electric generator.

The invention shall be better understood and other details, characteristics and advantages of the invention shall appear when reading the following description given by way of a non-restricted example in reference to the annexed drawings wherein.

Figure 1:
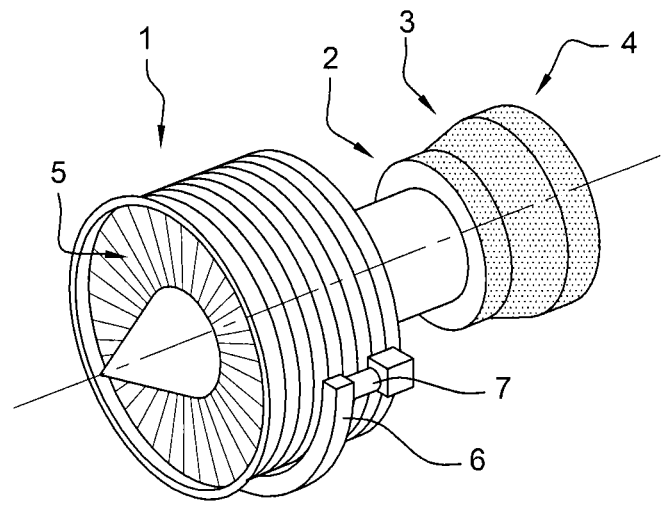
FIG. 1 is a diagrammatical view in perspective of a turbomachine of prior art.

FIG. 1 shows a turbomachine 1 of prior art comprising a combustion chamber 2, with the combustion gases coming from the chamber driving a high-pressure turbine 3 and a low-pressure turbine 4. The high-pressure turbine 3 is coupled by a shaft to a high-pressure compressor arranged upstream of the combustion chamber 2 and supply the latter with air under pressure. The low-pressure turbine 4 is coupled by another shaft to a fan wheel 5 arranged at the upstream end of the turbomachine 1.

A transmission gearbox 6, or accessory case, is connected by a mechanical power tap 7 to the high-pressure turbine shaft 3 and comprises a set of drive pinions for the various pieces of equipment of the turbomachine, such as pumps and generators, in particular electrical. Other power transmissions can also be used.

Figure 2:
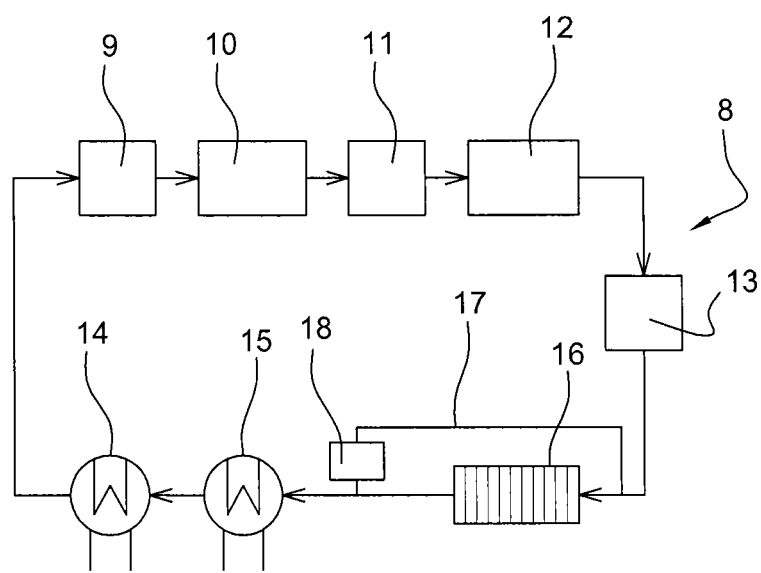
FIG. 2 is a partial diagrammatical view of an oil circuit of prior art.

The FIG. 2 shows an oil circuit 8 of the turbomachine of FIG. 1.

The oil circuit 8 comprises, from upstream to downstream in the direction in which the oil flows, various units 9 that use oil for lubrication and/or cooling, recovery pumps 10 allowing for the recirculation of oil from the pieces of equipment to a tank 11, supply pumps 12 and a filter 13.

Other than the oil used for the lubrication and cooling of the turbomachine 1, in particular shaft bearings of turbines and of compressors, the overall oil flow can comprise oil used for the lubrication of the accessory case and for the lubrication and cooling of one or several electric generators.

The oil circuit 8 comprises three heat exchangers mounted in series between the filter 13 and the units 9, namely a main oil/fuel heat exchanger 14, a secondary oil/fuel heat exchanger 15 and an oil/air heat exchanger 16.

The oil/air heat exchanger 16 can be of the surface type, i.e. comprising oil ducts swept by a flow of cold air coming from a bypass air flow commonly referred to as secondary air flow. Such an exchanger 16 is for example housed on a wall of the channel of the secondary flow immediately downstream of the fan (FIG. 1).

Alternatively, the oil/air heat exchanger 16 can be of the plate type and crossed by an air flow taken in the secondary air flow and reinjected at the outlet into the latter. According to another alternative, the air flow can be taken from the outside (ambient air).

During operation, at the outlet of the supply pumps 12, the oil passes through the oil/air heat exchanger 16, the secondary oil/fuel heat exchanger 15 then the main oil/fuel heat exchanger 14. A duct 17 is mounted in the oil circuit 8 as a bypass on the oil/air heat exchanger 16 and comprises an inlet arranged between the outlet of the filter 13 and the inlet of the oil/air heat exchanger 16 and an outlet arranged between the outlet of the oil/air heat exchanger 16 and the inlet of the secondary oil/fuel heat exchanger 15. A hydraulic valve 18 is mounted in the bypass line 17 and controls the passage of the oil flow in the oil/air exchanger 16 or through the bypass line 17 and the oil/air heat exchanger 16. The oil exiting the main oil/fuel heat exchanger 14 then circulates to the oil tank 11.

In cold operating conditions, the valve 18 opens in order to allow for the passing of oil through the bypass line 17.

As indicated hereinabove, the currently used oil/air exchangers 16 have relatively low outputs which requires the use of relatively bulky exchangers. However, as the latter are placed in the secondary air flow, they generate aerodynamic disturbances which increase with their dimensions, which penalises the overall output of the turbomachine.

Figure 3:
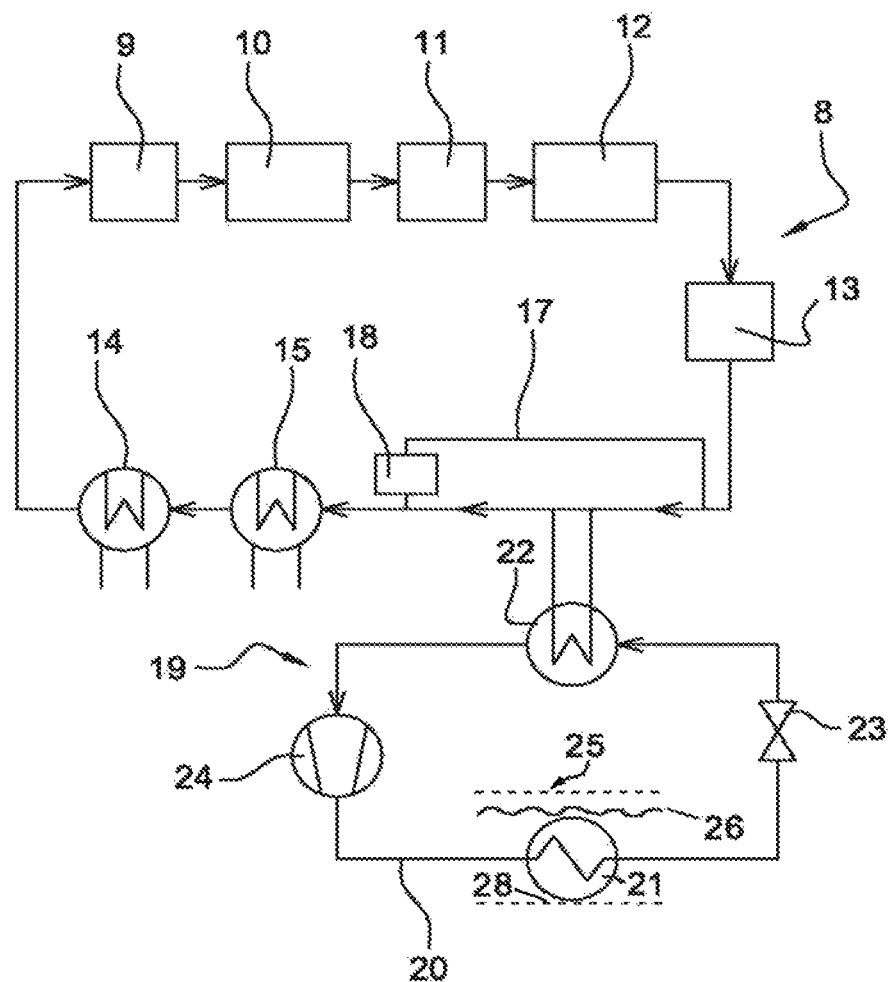
FIG. 3 is a view corresponding to FIG. 2, illustrating a form of an embodiment of an oil circuit of a turbomachine, provided with a device of the heat pump type, in accordance with the invention.

In order to avoid this, the invention propose to replace the oil/air exchanger 16 with a thermodynamic device 19 of the heat pump type. As is shown in FIG. 3, this device 19 comprises a refrigerant circuit 20 provided with a first heat exchanger 21 able to exchange heat between the refrigerant and the air and forming a condenser, a second heat exchanger 22 able to exchange heat between the refrigerant and the oil of the oil circuit 8 and forming an evaporator, an expander 23 mounted downstream of the first exchanger 21 and upstream of the second exchanger 22, in the direction in which the refrigerant circulates, and a compressor 24 mounted downstream of the second exchanger 22 and upstream of the first exchanger 21.

Figure 4:
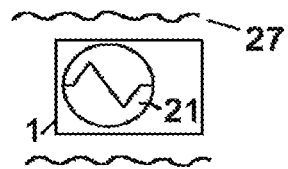
FIG. 4 is a diagrammatical view of a heat exchanger configured to exchange heat between a refrigerant and an ambient air that is external to the turbomachine, in a non-limiting example.

The first exchanger 21 can be of the surface type (refrigerant ducts swept by a flow of air), or of the plate type. In a non-limiting example, a channel 25 passes a secondary flow 26 coming from a fan, with the first heat exchanger 21 that is a condenser arranged in the secondary flow 26 and housed on a wall 28 of the channel 25, as shown in FIG. 3. In another non-limiting example, the first heat exchanger 21 is configured to exchange heat between the refrigerant and ambient air 27 that is external to the turbomachine, as shown in FIG. 4.

During operation, when it is necessary to cool the oil of the circuit 8, the compressor 24 is turned on. The evaporator 22 then makes it possible to vaporise the refrigerant by taking heat on the oil. The compressor 24 makes it possible to increase the pressure and the temperature of the refrigerant in vapour phase before the latter passes through the condenser 21 where it releases heat into to the air, by passing from the gaseous state to the liquid state. The refrigerant in liquid phase then passes through the expander 23 which has for role to reduce its pressure and to lower its temperature, before passing through the evaporator 22 again.

Such a device is in general characterised by its coefficient of performance (COP) which can for example be of a magnitude of 5. This means that, for one unit of energy brought to the compressor 24 (in the form of electrical energy), 5 units of energy (in the form of heat) are taken from the oil and transferred to the air.

The very good output of such a device 19 therefore makes it possible to limit the size of the exchanger 21 between the air and the refrigerant, in such a way as to not substantially affect the output of the turbomachine.

In particular, the size of the exchanger is limited by the fact that there can be exchanges between the refrigerant and the air with substantial differences in temperature.

Of course, such a thermodynamic device could be used in a turbomachine that has an oil circuit 8 with a structure different from that shown in FIG. 3.

The invention claimed is:

1. A turbomachine, or a turbojet engine or a turboprop engine of an aircraft, comprising:
   at least one oil circuit; and
   a thermodynamic refrigerant circuit to cool oil of the at least one oil circuit, comprising:
     a first heat exchanger configured to exchange heat between the refrigerant and air and forming a condenser,
     a second heat exchanger configured to exchange heat between the refrigerant and the oil of the at least one oil circuit and forming an evaporator,
     an expander mounted downstream of the condenser and upstream of the evaporator, in a direction in which the refrigerant circulates, and
     a compressor mounted downstream of the evaporator and upstream of the condenser,
   wherein the condenser is configured to exchange heat between the refrigerant and ambient air that is external to the turbomachine,
   wherein the at least one oil circuit is configured to lubricate and/or cool elements of a motor of the turbomachine and/or an electric generator,
   wherein the at least one oil circuit comprises a recovery pump, a tank, a supply pump, a filter, and an oil/fuel heat exchanger,
   wherein the at least one oil circuit passes the oil in a flow direction from upstream to downstream through at least one structure that uses the oil, the recovery pump, the tank, the supply pump, the filter, and the oil/fuel heat exchanger in this listed order, and wherein a portion of the at least one oil circuit that passes the oil through the evaporator is positioned upstream in the flow direction from the oil/fuel heat exchanger.

2. The turbomachine according to claim 1, wherein the thermodynamic refrigerant circuit has a coefficient of performance (COP) of a magnitude of 5.

3. The turbomachine according to claim 1, wherein the evaporator transfers heat from the oil to the refrigerant to bring the refrigerant to a temperature higher than 150° C.

4. The turbomachine according to claim 1, further comprising a channel to pass a secondary flow coming from a fan of the turbomachine, and wherein
the condenser is arranged in the secondary flow in the channel to release heat to the air by passing the refrigerant received by the condenser in a gaseous state to a liquid state.

5. The turbomachine according to claim 4, wherein the secondary flow is a bypass air flow coming from the fan of the turbomachine.

6. The turbomachine according to claim 4, wherein the condenser is housed on a wall of the channel that passes the secondary flow coming from the fan of the turbomachine.

7. The turbomachine according to claim 1, wherein the at least one oil circuit is configured to lubricate and/or cool elements of the electric generator.

8. A turbomachine, or a turbojet engine or a turboprop engine of an aircraft, comprising:
at least one oil circuit;
a channel to pass a secondary flow coming from a fan of the turbomachine; and
a thermodynamic refrigerant circuit to cool oil of the at least one oil circuit, comprising:
a first heat exchanger configured to exchange heat between the refrigerant and air and forming a condenser, and the condenser is arranged in the secondary flow in the channel to release heat to the air by passing the refrigerant received by the condenser in a gaseous state to a liquid state,
a second heat exchanger configured to exchange heat between the refrigerant and the oil of the at least one oil circuit and forming an evaporator,
an expander mounted downstream of the condenser and upstream of the evaporator, in a direction in which the refrigerant circulates, and
a compressor mounted downstream of the evaporator and upstream of the condenser,
wherein the at least one oil circuit comprises a recovery pump, a tank, a supply pump, a filter, and an oil/fuel heat exchanger,
wherein the at least one oil circuit passes the oil in a flow direction from upstream to downstream through at least one structure that uses the oil, the recovery pump, the tank, the supply pump, the filter, and the oil/fuel heat exchanger in this listed order, and
wherein a portion of the at least one oil circuit that passes the oil through the evaporator is positioned upstream in the flow direction from the oil/fuel heat exchanger.

9. The turbomachine according to claim 8, wherein the at least one oil circuit is configured to lubricate and/or cool elements of a motor of the turbomachine and/or an electric generator.

10. The turbomachine according to claim 8, wherein the secondary flow is a bypass air flow coming from the fan of the turbomachine.

11. The turbomachine according to claim 8, wherein the condenser is housed on a wall of the channel that passes the secondary flow coming from the fan of the turbomachine.

12. The turbomachine according to claim 8, wherein the thermodynamic refrigerant circuit has a coefficient of performance (COP) of a magnitude of 5.

13. The turbomachine according to claim 8, wherein the evaporator transfers heat from the oil to the refrigerant to bring the refrigerant to a temperature higher than 150° C.

* * * * *